United States Patent

Clark

[15] 3,644,837

[45] Feb. 22, 1972

[54] SYNCHRONOUS FACSIMILE GENERATOR

[72] Inventor: Ronald L. Clark, Indianapolis, Ind.

[73] Assignee: The United States of America as represented by the Secretary of the Navy

[22] Filed: Jan. 29, 1971

[21] Appl. No.: 110,916

[52] U.S. Cl. ................................328/188, 328/14, 328/143, 179/100.2 B, 178/6.6 R, 178/DIG. 4, 307/227

[51] Int. Cl. ................................G06g 7/28

[58] Field of Search ................................328/142, 143, 188, 14; 179/100.2 B; 178/6.6 R, DIG. 4; 307/227

[56] References Cited

UNITED STATES PATENTS

| | | | |
|---|---|---|---|
| 2,763,833 | 9/1956 | Brumbaugh | 178/DIG. 4 |
| 3,080,526 | 3/1963 | Porter | 328/188 X |
| 3,123,668 | 3/1964 | Silva | 179/100.2 B |
| 3,354,298 | 11/1967 | Danko | 328/142 X |
| 3,464,018 | 8/1969 | Cliff | 328/14 X |
| 3,489,849 | 1/1970 | Hedger | 328/188 X |
| 3,500,213 | 3/1970 | Ameau | 328/142 X |

*Primary Examiner*—John S. Heyman
*Attorney*—R. S. Sciascia and H. H. Losche

[57] ABSTRACT

A synchronous facsimile generator having a master tuning fork oscillator coupled through a squaring circuit to produce square wave oscillations that are applied to integrated division and NAND circuits to produce a plurality of different combinations of frequency and wave patterns to provide a plurality of different functions applicable to test a facsimile recorder of carrier, start, phase, gray scale, and stop, with an additional tap input for other desired test signals, each frequency and wave pattern function being applied through a selector switch to a modulator to modulate the carrier produced by the master oscillator thereby producing double sideband, amplitude modulated, phase synchronous with the carrier signals for test of a facsimile recorder.

7 Claims, 11 Drawing Figures

INVENTOR.
RONALD L. CLARK
BY
H. H. Losche
ATTORNEYS

INVENTOR.
RONALD L. CLARK
BY H. H. Losche
ATTORNEYS

INVENTOR.
RONALD L. CLARK
BY H. H. Losche
ATTORNEYS

SYNCHRONOUS FACSIMILE GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to synchronous facsimile generators and more particularly to signal generators capable of generating a plurality of different frequency wave patterns to apply to facsimile recorders for testing and aligning the recorder operation in the maintenance thereof.

Prior tests of facsimile recorders were made by individual circuit means or frequency generators but there have been no known means to make phase tests. Tape recorders have been used to get the various test frequency patterns thereon, such as a start, gray scale, resolution, automatic gain control, and stop frequency patterns but these are not suitable for exercising facsimile recorders and there is no power of selection with such tests. Such makeshift test means are often more in error than the equipment tested.

SUMMARY OF THE INVENTION

In this invention a master oscillator generates a frequency suitable for a facsimile recorder. This frequency is directed in one channel through a modulator to its output for connection to a recorder and through another channel to be conditioned in different frequency wave patterns selectively switched to the modulator. The other or second channel includes squaring circuits, division circuits, NAND circuits, staircase generators, and biasing circuits to accomplish the different frequency wave patterns to modulate the master oscillator frequency thereby maintaining in-phase relationship. Accordingly, a facsimile recorder may use these synchronous signals to test and align the carrier frequency, start, phase, gray scale 10 and 20, resolution, automatic gain control, and stop phase together with an input of an external frequency wave pattern, when desired. It is accordingly a general object of this invention to provide a test set generator of synchronous facsimile signals for application to a recorder to test and align the recorder for proper operation.

BRIEF DESCRIPTION OF THE DRAWING

These and other objects and the attendant advantages, features, and uses of this invention will become more apparent to those skilled in the art as a more detailed description is given of the drawings in which.

DESCRIPTION OF THE PREFERRED EMBODIMENT

Figure 1:
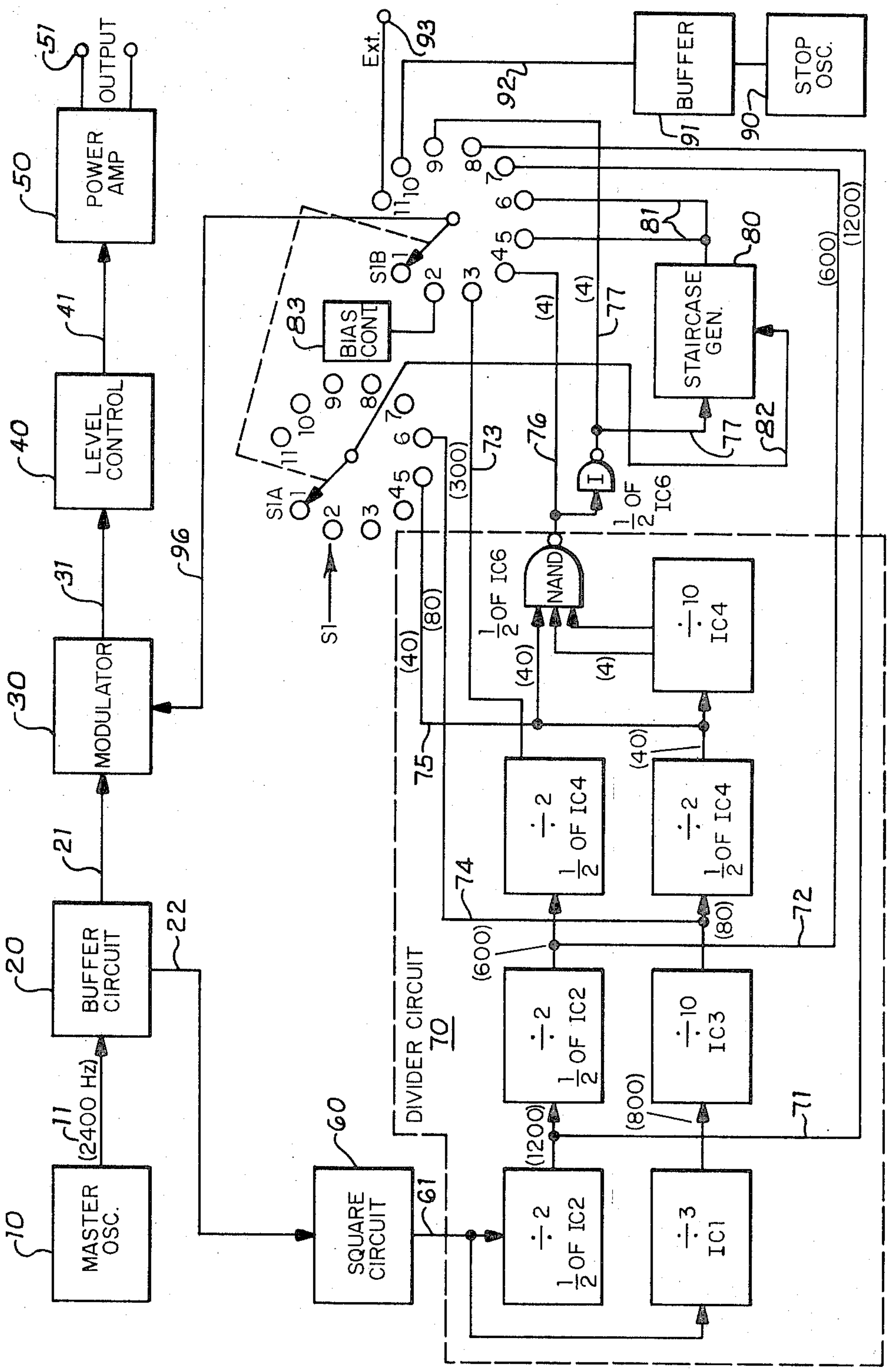
FIG. 1 is a block circuit schematic of the invention.

Referring more particularly to FIG. 1, there is illustrated a master oscillator 10 producing an output on the conductor means 11 which is passed through a buffer circuit 20 on an output 21 to a modulator 30. The buffer circuit 20 also has a second output conductor 22. The modulator 30 output 31 is passed through a level control network 40 and has an output 41 to a power amplifier 50 to produce on the output 51 a modulated carrier from the master oscillator 10.

The output 22 from the buffer circuit 20 is applied through a squaring circuit 60 to square the oscillator waveforms of the master oscillator 10. The output 61 from circuit 60 is applied to a divider circuit consisting of a plurality of integrated divider circuits (IC), IC1 through IC6 designated by reference character 70. IC1 divides by three and IC2 divides by two and are shown herein as having two parts. The output 61 of 60 is applied in parallel to IC1 and the first half of IC2. IC1 has an output into a divide-by-10 circuit IC3 while the output of the first half of IC2 is to the second half of IC2 also being a divide-by-two circuit. The output of the second half of IC2 is to the first half of IC4 while the output of IC3 is to the second half of IC4. The output of the second half of IC4 is to a divide-by-10 circuit IC5, the output of which is to one-half of the NAND-circuit IC6, the second half of IC6 being an inverter.

The outputs of the divider circuits 70 are to the various terminal contacts of a selector switch S1 being in two gangs, S1A and S1B. The output 71 from the first half of IC2 is coupled to terminal 8 of S1B. The output 72 of the second half of IC2 is coupled to terminal 7 of S1B. The output 74 of IC3 is to terminal 6 of S1A while the output 75 of the second half of IC4 is to terminal 5 of S1A. The output 73 of the first half of IC2 is to terminal 3 of S1B. The output 76 of the first half of IC6 or the NAND circuit is to terminal 4 of S1B. The output 77 from the second half of IC6, or the inverter, is to terminal 9 of S1B, this output 77 also being an input to a staircase generator 80, the output 81 of which is coupled in parallel to terminals 5 and 6 of S1B. The rotatable contact of S1A is coupled by a conductor 82 as the second input to the staircase generator 80. A bias control network 83 is coupled to terminal 2 of S1B. A stop oscillator 90 is coupled through a buffer circuit 91 of output 92 to terminal 10 of S1B. Terminal 11 of S1B is coupled to an external input terminal 93. The movable contact of S1B is coupled by a conductor 96 as the modulator input to modulator 30. Contact 1 of both gangs S1A and S1B are open or off terminals for the selector switch S1. Terminals 2, 3, 4, and 7 through 11 of S1A are all open terminals.

Assuming for the purpose of example, the master oscillator 10 may generate a frequency of 2,400 Hertz (Hz.) which is squared in the squaring circuit 60 and applied by conductor 61 to the divider circuit 70. IC1 divides by three to produce an output of 800 Hz. which is divided by 10 in IC3 to produce 80 Hz. on its output which is divided by two in the second half of IC4 to produce 40 Hz. which is again divided by 10 in IC5 to produce a frequency of 4 Hz. In like manner the second half of IC2 divides the 1,200 Hz. frequency by two to produce 600 which is divided by the first half of IC4 by two to produce 300. As hereinabove described, the output of divide circuit 70 is coupled to the selector switch S1 such that 40 Hz. is supplied by conductor 75 to terminal 5, 80 Hz. is applied to terminal 6 of S1A, 300 Hz. is applied to terminal 3 of S1B, 4 Hz. is applied to terminal 4 of S1B, and the inverted of this 4Hz is applied to terminal 9 of S1B. 600 Hz. is applied by conductor 72 to terminal 7 of S1B while 1,200 Hz. is applied by conductor 70 to terminal 8 of S1B. The bias 83 is applied to terminal 2 of S1B and the stop oscillator 90 is applied to terminal 10 of S1B. In this manner the selector switch can be positioned to select the various Hz. waveforms including the staircase waveforms to be applied as a modulated frequency to the modulator 30 which will be in phase with the 2,400 Hz. carrier initially generated by the master oscillator 10. The wave frequencies divided out are shown in parenthesis above the conductors on which they occur. These frequencies are shown herein for the purpose of an example of operation and are not to be taken for limiting the invention to the uses of these particular frequencies since other frequencies may be utilized as desired for the application to any facsimile recorder.

Figure 2:
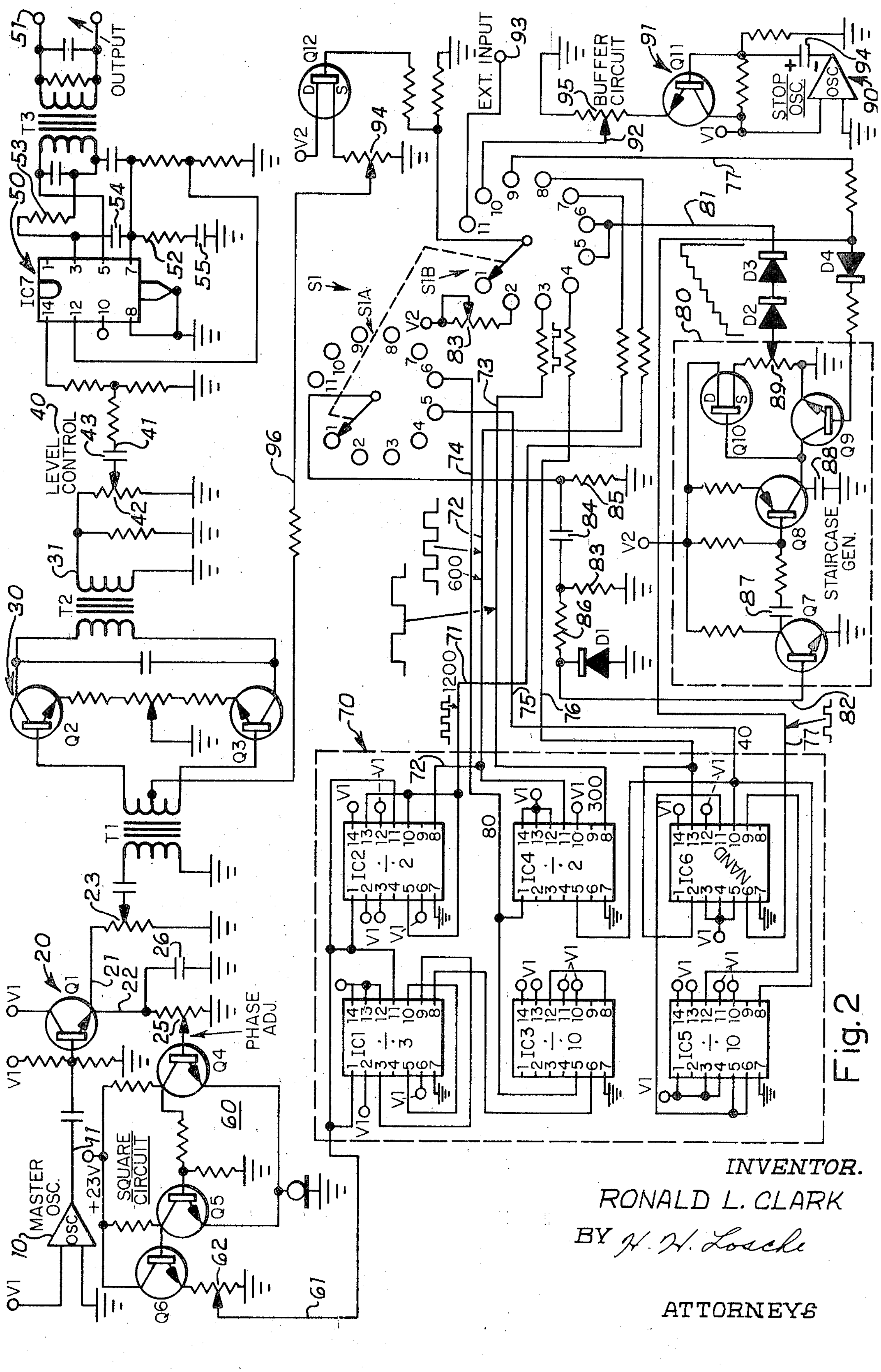
FIG. 2 is a circuit schematic diagram of the block circuit shown in FIG. 1.

Referring now more particularly to FIG. 2, like reference characters will be used for like parts or conductors as used in FIG. 1 since several of the blocks of FIG. 1 are shown in detail herein in the approximate position of the block in FIG. 1. The master oscillator 10 is preferably of the tuning fork oscillator type to provide a stable carrier frequency herein, being given as an example, to generate 2,400 Hz. The buffer circuit 20 consists of a transistor Q1 having its base terminal biased through a voltage divider from a voltage source V1. The output 21 from the buffer circuit 20 is through an amplitude control potentiometer 23 which is coupled through an isolating transformer T1 to the modulator 30. The modulator 30 has the base electrode of two transistors Q2 and Q3 coupled to the secondary leads of transformer T1 and the modulating input 96 center-tapped to this secondary lead. The output 31 of modulator 30 is through an isolating transformer T2, through the level control 40 consisting of potentiometer 42 and a coupling capacitor 43, and through a resistor to a terminal input of integrated circuit, IC7, providing power amplification. The power amplifier 50 or IC7 is coupled with various biasing elements therein as resistors 52, 53, capacitors 54 and 55 through an isolating transformer T3 to the output terminal 51.

The output 22 of the buffer circuit 20 is from the emitter of Q1 through a phasing potentiometer 25 having a capacitor 26 in parallel therewith. The movable contact of potentiometer 25 is to the base electrode of the first transistor Q4 in the squaring circuit 60 which is preferably a Schmitt trigger having transistors Q4, Q5, and Q6. The output from the squaring circuit 60 is taken from the emitter follower Q6 by way of the adjustable tap to conductor 61 of an amplitude potentiometer 62. The output 61 is applied to the divider circuit 70 as hereinabove described for FIG. 1 with IC1 through IC6 shown within the broken lines and connected to the various 14 terminals, as shown, to produce the output frequency of 1,200, 600, 300, 80, 40, and 4 Hz. The outputs 71 through 77 from the divider circuit 70 are coupled to the selector switch S1, as hereinabove described for FIG. 1. The square wave patterns are shown immediately over the conductors on which they occur in this Figure.

The staircase generator 80 includes three transistors Q7, Q8, and Q9, the first of which Q7 has its base electrode coupled by way of the conductor 82 to the adjustable switch contact of S1A, this circuit being through a differentiator consisting of the resistance 83 and capacitor 84. The resistor 85 is used for biasing while the resistor 86 is current limiting. The diode D1 is coupled between the conductor 82 and ground to prevent signals on 82 from going below ground. The transistors Q7, Q8, and Q9, are coupled in a biasing circuit from a voltage source V2 with the collector of Q7 being coupled through a capacitor 87 to the base of transistor Q8. The collector of Q8 is coupled to one plate of a capacitor 88 the opposite plate of which is grounded and the opposite plate is coupled to collector Q9 in parallel with the base electrode of a field effect transistor (FET) herein identified by Q10. The drain electrode of Q10 is coupled to the voltage source V2 while the source electrode is coupled through the resistance of potentiometer 89 to the emitter electrode of Q9. The adjustable tap of the potentiometer 89 is through diodes D2 and D3 in series constituting the output 81 of the staircase generator. The output 77 from the inverter of IC6 is through a diode D4 to the base of transistor Q9. Whenever the selector switch S1 is on contact 5 the 40 Hz. frequency is applied to the staircase generator by conductor 82 and the 4 Hz. is applied by way of conductor 77 and diode D4 to the staircase generator to cause build up on the capacitors 87 and 88 to produce the staircase output as shown above the output conductor 81 from the potentiometer 89, such staircase generator operating, as in a well known manner by those skilled in the art.

The stop oscillator 90 is capacitor coupled through 94 to the base of a buffer circuit transistor Q11 to output 92 being taken from the adjustable tap of a potentiometer 95 having the resistance element thereof coupled by the emitter of Q11 and ground. The stop oscillator receives its voltage source from the terminal V1 the opposite terminal being shown as ground.

There are primarily two DC voltages used as shown in FIGS. 1 and 2 being voltages V1 and V2. For the purpose of example herein the voltages V1 may be a 5 v. source while the voltages V2 may be 23 v. although other voltages may be used as desired for particular purposes or elements.

Figure 3:
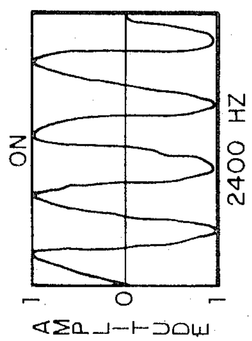
FIGS. 3 through 11 are waveform patterns of the modulated output of either FIGS. 1 or 2.
Figure 11:
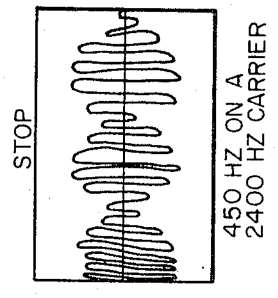

The IC circuits 1 through 7 are conventional off-the-shelf items which are fully described in catalogues from the manufacturer. For the purpose of example herein but not to be limited to the particular IC circuit, the IC circuits IC1, IC2, and IC4, are dual JK flip-flop circuits made by Signatics Co. under the identification number S8822A. IC3 and IC5 are decade counter circuits produced by the same company under the number S8280A. IC6 is a dual four-input NAND gate made by the same company under the number S8855A. IC7 is a power amplifier integrated circuit made by General Electric under the number PA237. FIGS. 3 and 11 illustrate the various waveforms produced by the functions of test circuit outputs of this invention and will be described under the description of "Operation" under the various function outputs for the system.

OPERATION

In the operation of this device when the selector switch S1 is on terminal 1, this will be the off position for the circuit. When switch S1 is positioned on terminal 2, the function will be provided and herein designated as function 1 which will supply a bias from 83 to the modulator 30 merely to bias the carrier frequency of 2,400 Hz. to the output. In other words this will be a one modulator carrier of 2,400 Hz. ± 2.4 Hz. The waveform of this function is shown in FIG. 3.

Figure 4:
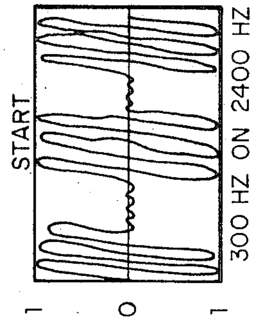

Function 2 in which S1 is on contact 3 will provide the start function which provides a 300 Hz. amplitude modulation on the 2,400 Hz. carrier which is used by starting facsimile recorders for starting operation from a standby condition, it being understood that the output S1 is to be coupled to a facsimile recorder for exercising the test of various functions of the recorder. The waveform of this function is shown in FIG. 4.

Figure 5:
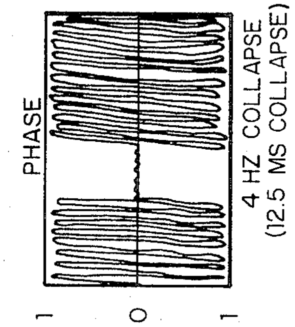

Function 3 in which S1 is on contact 4, is the phase function provided for testing. The facsimile recorder connected to terminal S1 will use the 4 Hz. carrier collapse to align its line sweep so that the beginning of each line shall correspond to the beginning of the line (12.5 msec. carrier collapse) being generated, and being so positioned the beginning of the line is located to the left margin of the print material of the facsimile recorder. The waveform of this function is shown by FIG. 5.

Figure 6:
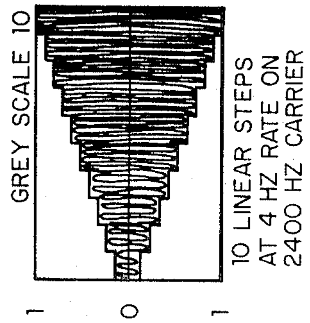

Function 4 which has S1 on contact 5 provides a gray scale 10 function. This function provides a linear 10-step amplitude modulator 4 Hz. stairstep on the phase-synchronous 2,400 Hz. carrier which is used to test and align the dynamic range of the facsimile recorder. The 10 steps of this waveform are shown in FIG. 6.

Figure 7:
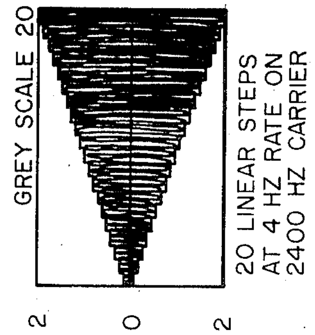

Function 5 in which S1 is on contact 6 provides a gray scale 20 function. This function provides a linear 20-step amplitude modulated 4 Hz. stairstep on the phase-synchronous 2,400 Hz. carrier which is used to test and align the dynamic range of the facsimile recorder. The 20 steps of this gray scale are shown by FIG. 7.

Figure 8:
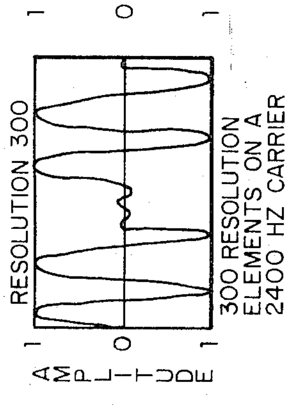

Function 6 in which S1 is on contact 7 provides 300 resolution elements per line (4 lines per second) which are synchronous to the carrier and are used to check and align the writing mechanism of the facsimile recorder. The resolution 300 waveform is shown in FIG. 8.

Figure 9:
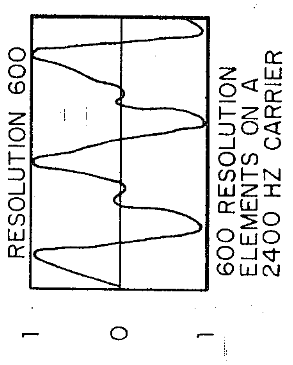

Function 7 in which S1 is on contact 8 provides a resolution 600 function. This function provides 600 resolution elements per line (4 lines per second) which are synchronous to the carrier and are used to check and align the writing mechanism of the facsimile recorder. The waveform shown for the output S1 is the resolution 600 waveform shown in FIG. 9.

Figure 10:
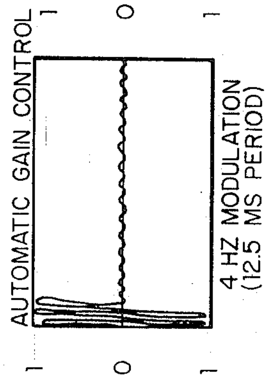

Function 8 in which S1 is on contact 9 provides the automatic gain control function. This function provides a 4 Hz. 12.5-millisecond pulse that is amplitude modulated on the synchronous 2,400 Hz. carrier and is used to check and align the automatic gain control circuits for response time and distortion. The output of S1 is shown by the waveform in FIG. 10.

Function 9 in which S1 is on contact 10 provides the stop function. This function provides a 450 Hz. amplitude modulation on the 2,400 Hz. carrier which is used as an operating command for facsimile recorder to revert it to the standby condition. This stop function frequency on the output S1 is shown in FIG. 11.

Function 10 in which S1 is on contact 11 provides the external input function. This function will allow externally applied signals to amplitude modulate the 2,400 Hz. carrier for special tests. These various function outputs on S1 as shown by FIGS. 3 through 11 may be increased or decreased in amplitude by the level control 40, adjustable potentiometer 42, in a range of, for example, 0 to 10 volts. The phase adjusted potentiometer 25 will adjust the triggering point of Q4 to the phase of the carrier frequency from the master oscillator 10 to maintain the squared wave output on the output 61 exactly in phase with the oscillator 10 frequency. The wave potentiometers such as 23, 83, 89, 94, and 95, are means of adjusting the amplitudes of the various signals passing therethrough. By the various potentiometer adjustments and switch S1 the carrier frequency of 2,400 Hz. used as an example herein may be modulated in various ways to provide test signals to exercise facsimile recorders throughout their several functions.

While many modifications and changes may be made in the various voltages and frequencies used in accomplishing various deviations, it is to be understood that I desire to be limited in the spirit of my invention only by the scope of the claims herein.

I claim:

1. A synchronous facsimile signal generator for testing recorders comprising:

a master oscillator for generating a stable frequency on an output thereof;

a modulator coupled to the output of said master oscillator and having a modulation input and an output;

a bank of divider circuits coupled to the output of said master oscillator to provide a plurality of frequency divisions on a plurality of respective outputs thereof of said stable frequency;

a two-gang selector switch, each gang having the contacts coupled to said plurality of divider circuit outputs and each gang having a selector output, the selected output of one of the two-gang selector switch being coupled to said modulator to modulate said stable frequency from said master oscillator in phase; and a staircase generator having inputs coupled to said selector output of the other of said two-gang selector switch and an output of one of said divider circuits and having an output coupled to contacts of said one gang of said two-gang selector switch whereby the stable frequency of the master oscillator is modulated in phase with the selected frequency division wave patterns and staircase wave patterns to provide selected modulated signals of double sideband on the stable frequency carrier representative of signals used in the operation of recorders to exercise such recorders in maintaining alignment.

2. A synchronous facsimile signal generator as set forth in claim 1 wherein said output of said modulator includes an amplitude level control to adjust the voltage amplitude of said modulated signals.

3. A synchronous facsimile signal generator as set forth in claim 2 wherein said two-gang selector switch includes contacts for the connection of biasing voltages, stop oscillators, and external voltage waveform inputs.

4. A synchronous facsimile signal generator as set forth in claim 3 wherein said divider circuits are integrated circuit modules.

5. A synchronous facsimile signal generator as set forth in claim 4 wherein said coupling between said master oscillator output and said bank of divider circuits includes a squaring circuit to provide square wave oscillations to said divider circuits.

6. A synchronous facsimile signal generator as set forth in claim 5 wherein said coupling of said modulator to the output of said master oscillator includes a first buffer circuit and said coupling between said master oscillator and said divider circuits through a squaring circuit constitutes coupling an output of said first buffer circuit to the input of said squaring circuit through an amplitude adjustable potentiometer.

7. A synchronous facsimile signal generator as set forth in claim 6 wherein said stop oscillator coupling to said two-gang selector switch includes a second buffer circuit with an output through an amplitude adjustable potentiometer.

* * * * *